United States Patent
Tsai et al.

(10) Patent No.: US 6,811,910 B2
(45) Date of Patent: Nov. 2, 2004

(54) METAL AIR CELL INCORPORATING AIR FLOW SYSTEM

(75) Inventors: Tsepin Tsai, Chappaqua, NY (US); William F. Morris, Yonkers, NY (US)

(73) Assignee: Evionyx, Inc., Hawthorne, NY (US)

( * ) Notice: Subject to any disclaimer, the term of this patent is extended or adjusted under 35 U.S.C. 154(b) by 280 days.

(21) Appl. No.: 10/198,255

(22) Filed: Jul. 18, 2002

(65) Prior Publication Data

US 2003/0017376 A1 Jan. 23, 2003

Related U.S. Application Data

(60) Provisional application No. 60/306,397, filed on Jul. 18, 2001.

(51) Int. Cl.[7] .............................. H01M 2/00; H01M 8/04
(52) U.S. Cl. ......................... 429/27; 429/148; 429/163; 29/623.1
(58) Field of Search ............................. 429/27, 29, 62, 429/148, 163, 26

(56) References Cited

U.S. PATENT DOCUMENTS

| | | | | |
|---|---|---|---|---|
| 5,356,729 A | * | 10/1994 | Pedicini | 429/27 |
| 5,571,630 A | * | 11/1996 | Cheiky | 429/26 |
| 6,365,296 B1 | * | 4/2002 | Young | 429/82 |
| 6,641,947 B1 | * | 11/2003 | Molloy et al. | 429/39 |

* cited by examiner

*Primary Examiner*—Patrick Ryan
*Assistant Examiner*—Tracy Dove
(74) *Attorney, Agent, or Firm*—Ralph J. Crispino

(57) ABSTRACT

A metal air cell system comprises a frame structure configured with variable airflow paths. The variable airflow paths provide alternatives between direct open loop airflow and semi-closed loop air flow, wherein air is at least partially circulated around the cell components. This is particularly useful for operation in different temperature environments. The open loop mode is useful for high temperature environments, and the semi-closed loop mode is useful for low temperature environments.

25 Claims, 6 Drawing Sheets

METAL AIR CELL INCORPORATING AIR FLOW SYSTEM

RELATED APPLICATIONS

The present application claims priority to U.S. Provisional Application Ser. No. 60/306,397 filed Jul. 18, 2001 entitled "Metal Air Cell Incorporating Air Flow System:, the entire disclosure of which is incorporated by reference herein.

BACKGROUND OF THE INVENTION

1. Field of the Invention

This invention relates to metal air cells, and particularly to a metal air cell incorporating an air flow system.

2. Description of the Prior Art

Electrochemical power sources are devices through which electric energy can be produced by means of electrochemical reactions. These devices include metal air electrochemical cells such as zinc air and aluminum air batteries. The anode is generally formed of oxidizable metals, which in some instances, may be replaced or recharged. The cathode generally comprises an air diffusion electrode for oxidizing air. The electrolyte is usually a caustic liquid that is ionic conducting but not electrically conducting.

Metal air electrochemical cells have numerous advantages over traditional hydrogen-based fuel cells. Metal air electrochemical cells have high energy density (W*hr/Liter) and high specific energy (W*hr/kg). Further, the supply of energy provided from metal air electrochemical cells is virtually inexhaustible because the fuel, such as zinc, is plentiful and can exist either as the metal or its oxide. Additionally, metal air cells are capable of operating at ambient temperatures. Moreover, solar, hydroelectric, or other forms of energy can be used to convert the metal from its oxide product back to the metallic fuel form. Unlike conventional hydrogen-oxygen fuel cells that require refilling, the fuel of metal air electrochemical cells is recoverable by electrically recharging. The fuel may be solid state, therefore, safe and easy to handle and store. In contrast to hydrogen-oxygen fuel cells, which use methane, natural gas, or liquefied natural gas to provide as source of hydrogen, and emit polluting gases, the metal air electrochemical cells results in zero emission.

The metal air electrochemical operate at ambient temperature, whereas hydrogen-oxygen fuel cells typically operate at temperatures in the range of 150° C. to 1000° C. Metal air electrochemical cells are capable of delivering higher output voltages (1.5–3 Volts) than conventional fuel cells (<0.8V). Due to these advantages, metal air electrochemical cells can be used as power sources of all kind of applications, such as stationary or mobile power plant, electric vehicle or portable electronic device, etc.

One of the principle obstacles of metal air electrochemical cells is control of the temperature of the electrochemical cell. The electrochemical reaction in the cell increases temperature, primarily from internal resistance. With conventional metal air systems, ambient temperature increases in combination with the internal resistance detrimentally affect cell performance. Further, ambient temperature decreases generally results in lower conductivity of the electrolyte, thus detrimentally affecting cell output.

Therefore, a need remains in the art for a metal air cell that minimizes or preferably eliminates problems associated with temperature variations.

SUMMARY OF THE INVENTION

The above-discussed and other problems and deficiencies of the prior art are overcome or alleviated by the metal air cell of the present invention, wherein a frame for supporting the cathode and the anode is configured with a periphery air flow path channel for storing heat generated by air that has reacted with the cathode oxidant side, and a reaction path region complementary to the cathode oxidant side.

A method of operating an electrochemical cell is also provided including:

directing unreacted oxidant substantially directly to the cathode and directing reacted oxidant out of the cell in a first mode of operation; and directing unreacted oxidant substantially directly to the cathode and directing reacted oxidant into a periphery region to retain heat in a second mode of operation.

The above-discussed and other features and advantages of the present invention will be appreciated and understood by those skilled in the art from the following detailed description and drawings.

DETAILED DESCRIPTION OF THE ILLUSTRATIVE EMBODIMENTS

Figure 1:
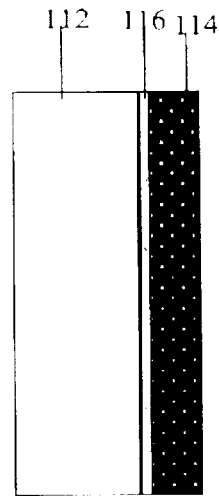
FIG. 1 is a schematic representation of an electrochemical cell.

Referring now to the drawings, an illustrative embodiment of the present invention will be described. For clarity of the description, like features shown in the figures shall be indicated with like reference numerals and similar features as shown in alternative embodiments shall be indicated with similar reference numerals.

FIG. 1 is a schematic representation of an electrochemical cell 110. Electrochemical cell 110 may be a metal air or metal oxygen cell, wherein metal fuel is supplied from a metal anode structure 112 and the oxygen is supplied to an oxygen cathode 114. The anode 112 and the cathode 114 are maintained in electrical isolation from one another by a separator 116. Further, an ion conducting media is provided, which may be in the form of a liquid bath in which the cell 110 is immersed, a gelatinous ion conducting media mixed with the anode 112, an electrolyte separator, or a combination comprising at least one of the foregoing forms of ion conducting media. It should be noted that the shape of the cell and of the components therein is not constrained to be square or rectangular; it can be tubular, circular, elliptical, polygonal, or any desired shape. Further, the configuration of the cells components, i.e., vertical, horizontal, or tilted, may vary, even though the cell components are shown as substantially vertical in FIG. 1.

Oxygen from the air or another source is used as the reactant for the air cathode 114 of the metal air cell 110. When oxygen reaches the reaction sites within the cathode 114, it is converted into hydroxyl ions together with water. At the same time, electrons are released to flow as electricity in the external circuit. The hydroxyl travels through the separator 116 to reach the metal anode 112. When hydroxyl reaches the metal anode (in the case of an anode 112 comprising, for example, zinc), metal hydroxide is formed on the surface of the metal anode. Metal hydroxide decomposes to metal oxide and releases water back to the alkaline solution. The reaction is thus completed. During electrochemical reaction, heat is typically generated due to the internal resistance of the cell components.

Figure 2A:
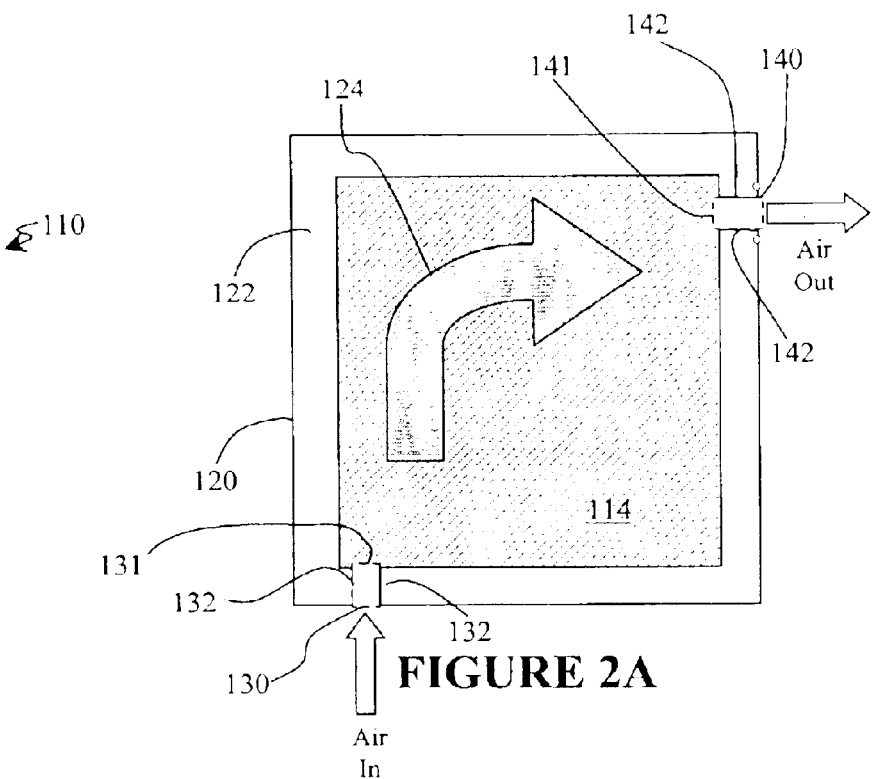
FIGS. 2A and 2B depict embodiments of airflow paths in accordance with the invention.
Figure 2B:
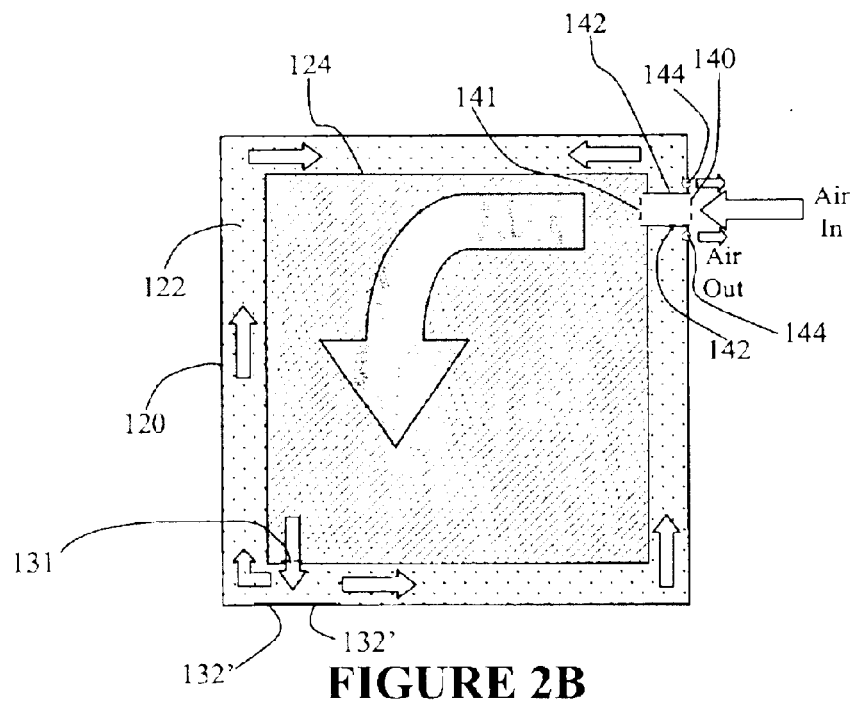

Referring now to FIGS. 2A and 2B, various airflow paths are depicted, which represents airflow across the oxidant side of the cathode 114. These airflow paths may be varied based on factors including, but not limited to, temperature, discharging voltage, discharging current, oxygen concentration, or combinations comprising at least one of the foregoing factors.

The airflow paths include a periphery channel 122 and a reaction path 124. The periphery channel 122 may be integrally formed in a frame 120 supporting the cathode 114, the anode 112 (not shown in FIGS. 2A and 2B), and the separator 116 (not shown in FIGS. 2A and 2B). The reaction path 124 is directed across the cathode 114. The air may be forced across the cathode 114, for example, by one or more fans, blowers, or the like. Optionally, a scrubber may be included in the system, generally to remove carbon dioxide to increase the overall lifetime of the cell 110.

In one mode of operating the cell 110, and referring now to FIG. 2A, air is directed through a set of apertures 130, 131. The aperture 130 is an outer aperture in fluid communication with the outside of the frame 120, and the aperture 131 is an inner aperture in fluid communication with the cathode 114. The air flows directly across the channel 122 into the channel 124. A pair of movable baffles 132 is provided to fluidly isolate the air flow path from the channel 122. As oxygen from the air is consumed at the cathode, the air flow exits the cell 110 through a set of apertures 141, 140. The air flows from the channel 124 directly across the channel 122 out of the cell 110. This mode is referred to herein as the "open loop mode". A pair of stationary baffles 142 is provided to fluidly isolate the air flow path from the channel 122. The aperture 140 is an outer aperture in fluid communication with the outside of the frame 120, and the aperture 141 is an inner aperture in fluid communication with the cathode 114.

In another mode of operating the cell 110, and referring now to FIG. 2B, air is introduced via the apertures 140, 141. The aperture 130 is closed off, generally by movement of the baffles 132'. This mode is referred to herein as the "semi-closed loop mode". It is understood that various mechanical devices may be used to close off the aperture 130, including a single baffle, multiple baffles, a sliding door, a rotary valve, or the like. A separate blower or fan (not shown) is typically associated with aperture 140 to controllably force to air across the cathode 114. Preferably, sufficient air for electrochemical reaction is introduced into the cell 110, thus excess air is eliminated, which may result in heat loss. Note that the air blower or fan may use various feedback signals, including but not limited to oxygen concentrations, discharging voltage, and internal temperature, to control the airflow within the cell 110. This mode of operation is particularly useful, for example, during low-temperature operation (e.g., less than about −10 C., and generally as low as electrochemical reactions with the place, for example, −40 C.).

In the semi-closed loop mode, air is introduced directly to the cathode 114. The internal resistance of the cell may heat the air. Optionally, one or more heating elements may be included within the path of the air flowing to the cathode 114 to preheat the air prior to introduction to the cathode 114. The heating elements may comprise heat pipes, heat sinks, solid heat conductive rods or fins (e.g., copper or other metal), fluid filled pipes (e.g., heating and/or cooling water), or any combination comprising at least one of the foregoing heating elements. The heating elements may be part of the frame, part of the cathode, or part of the anode. Further, the optional heating elements may be in thermal communication with the electrolyte, to transfer heat therefrom. Additionally, heating elements may be attached to the cell frame 120, which may promote electrolyte circulation.

The air flow exits the cathode 114 via aperture 131, and circulates within the channel 122. The air in the channel 122 may remain in the channel, or alternatively may follow a path allowing it to flow into the cathode 114 (not shown). The air circulating in the channel 122 may be heated by the internal resistance of the cell 110, thereby maintaining a desirable temperature. The increased temperature of the cell during the semi-closed loop mode is particularly useful for low-temperature electrochemical reactions. The air may be removed from the channel 122 via a pair of apertures 144. The apertures 144 may be selectively opened, for example, with one or more doors (not shown).

The open loop mode and the semi-closed loop mode may be alternated, depending on the particular conditions. For example, during low temperature operation, if the system is operating in the semi-closed loop mode, a condition may arise in which the internal temperature increases beyond a desirable operating temperature. Therefore, the system may switch to the open loop mode to remove excess heat, which, incidentally, can occur relatively quickly in cold ambient air environments.

The amount of air flow across the cathode 114 may be constant or variable. For example, a quantity of airflow may vary based on the desired operating voltage or current, the internal temperature of the cell 110, the ambient temperature, or combination thereof. Thus, an accompanying control may be provided to, inter alia, control volume of airflow across the cathode 114 by increasing and/or decreasing the speed of one or more blowers.

The anode 112 generally comprises a metal constituent such as metal and/or metal oxides and a current collector. Optionally an ionic conducting medium is provided within the anode 112. Additionally, in certain embodiments, the anode 112 comprises a binder and/or suitable additives. Preferably, the formulation optimizes ion conduction rate, capacity, density, and overall depth of discharge, while minimizing shape change during cycling.

The metal constituent may comprise mainly metals and metal compounds such as zinc, calcium, lithium, magnesium, ferrous metals, aluminum, and oxides of at least one of the foregoing metals, or combinations and alloys comprising at least one of the foregoing metals. These metals may also be mixed or alloyed with constituents including, but not limited to, bismuth, calcium, magnesium, aluminum, indium, lead, mercury, gallium, tin, cadmium, germanium, antimony, selenium, thallium, oxides of at least one of the foregoing metals, or combinations comprising at least one of the foregoing constituents. The metal constituent may be provided in the form of powder, fibers, dust, granules, flakes, needles, pellets, or other particles.

The anode current collector may be any electrically conductive material capable of providing electrical conductivity and optionally capable of providing support to the anode 112. The current collector may be formed of various electrically conductive materials including, but not limited to, copper, brass, ferrous metals such as stainless steel, nickel, carbon, electrically conducting polymer, electrically conducting ceramic, other electrically conducting materials that are stable in alkaline environments and do not corrode the electrode, or combinations and alloys comprising at least one of the foregoing materials. The current collector may be in the form of a mesh, porous plate, metal foam, strip, wire, plate, or other suitable structure.

The ionic conducting medium generally comprises alkaline media to provide a path for hydroxyl to reach the metal and metal compounds. In certain embodiments, an ion-conducting amount of electrolyte is provided in anode 112. The electrolyte generally comprises ionic conducting materials such as KOH, NaOH, LiOH, other materials, or a combination comprising at least one of the foregoing electrolyte media. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 45% ionic conducting materials. Other electrolytes may instead be used, however, depending on the capabilities thereof, as will be obvious to those of skill in the art.

The optional binder of the anode 112 primarily maintains the constituents of the anode in a solid or substantially solid form in certain configurations. The binder may be any material that generally adheres the anode material and the current collector to form a suitable structure, and is generally provided in an amount suitable for adhesive purposes of the anode. This material is preferably chemically inert to the electrochemical environment. In certain embodiments, the binder material is soluble, or can form an emulsion, in water, and is not soluble in an electrolyte solution. Appropriate binder materials include polymers and copolymers based on polytetrafluoroethylene (e.g., Teflon® and Teflon® T-30 commercially available from E.I. du Pont Nemours and Company Corp., Wilmington, Del.), polyvinyl alcohol (PVA), poly(ethylene oxide) (PEO), polyvinylpyrrolidone (PVP), and the like, and derivatives, combinations and mixtures comprising at least one of the foregoing binder materials. However, one of skill in the art will recognize that other binder materials may be used.

Optional additives may be provided to prevent corrosion. Suitable additives include, but are not limited to indium oxide; zinc oxide, EDTA, surfactants such as sodium stearate, potassium Lauryl sulfate, Triton® X-400 (available from Union Carbide Chemical & Plastics Technology Corp., Danbury, Conn.), and other surfactants; the like; and derivatives, combinations and mixtures comprising at least one of the foregoing additive materials. However, one of skill in the art will determine that other additive materials may be used.

The oxygen supplied to the cathode 114 may be from any oxygen source, such as air; scrubbed air; pure or substantially oxygen, such as from a utility or system supply or from on site oxygen manufacture; any other processed air; or any combination comprising at least one of the foregoing oxygen sources.

Cathode 114 may be a conventional air diffusion cathode, for example generally comprising an active constituent and a carbon substrate, along with suitable connecting structures, such as a current collector. Typically, the cathode catalyst is selected to attain current densities in ambient air of at least 20 milliamperes per squared centimeter ($mA/cm^2$), preferably at least 50 $mA/cm^2$, and more preferably at least 100 $mA/cm^2$. Of course, higher current densities may be attained with suitable cathode catalysts and formulations. The cathode 114 may be a bi-functional, for example, which is capable of both operating during discharging and recharging.

The carbon used is preferably chemically inert to the electrochemical cell environment and may be provided in various forms including, but not limited to, carbon flake, graphite, other high surface area carbon materials, or combinations comprising at least one of the foregoing carbon forms.

The cathode current collector may be any electrically conductive material capable of providing electrical conductivity and preferably chemically stable in alkaline solutions, which optionally is capable of providing support to the cathode 114. The current collector may be in the form of a mesh, porous plate, metal foam, strip, wire, plate, or other suitable structure. The current collector is generally porous to minimize oxygen flow obstruction. The current collector may be formed of various electrically conductive materials including, but not limited to, copper, ferrous metals such as stainless steel, nickel, chromium, titanium, and the like, and combinations and alloys comprising at least one of the foregoing materials. Suitable current collectors include porous metal such as nickel foam metal.

A binder is also typically used in the cathode 114, which may be any material that adheres substrate materials, the current collector, and the catalyst to form a suitable structure. The binder is generally provided in an amount suitable for adhesive purposes of the carbon, catalyst, and/or current collector. This material is preferably chemically inert to the electrochemical environment. In certain embodiments, the binder material also has hydrophobic characteristics. Appropriate binder materials include polymers and copolymers based on polytetrafluoroethylene (e.g., Teflon® and Teflon® T-30 commercially available from E.I. du Pont Nemours and Company Corp., Wilmington, Del.), polyvinyl alcohol (PVA), poly(ethylene oxide) (PEO), polyvinylpyrrolidone (PVP), and the like, and derivatives, combinations and mixtures comprising at least one of the foregoing binder materials. However, one of skill in the art will recognize that other binder materials may be used.

The active constituent is generally a suitable catalyst material to facilitate oxygen reaction at the cathode 114. The catalyst material is generally provided in an effective amount to facilitate oxygen reaction at the cathode 114. Suitable catalyst materials include, but are not limited to: manganese, lanthanum, strontium, cobalt, platinum, and combinations and oxides comprising at least one of the foregoing catalyst materials.

An exemplary air cathode is disclosed in copending, commonly assigned U.S. patent application Ser. No. 09/415,449, entitled "Electrochemical Electrode For Fuel Cell", to Wayne Yao and Tsepin Tsai, filed on Oct. 8, 1999, which is incorporated herein by reference in its entirety. Other air cathodes may instead be used, however, depending on the performance capabilities thereof, as will be obvious to those of skill in the art.

To electrically isolate the anode 112 from the cathode 114, the separator 116 is provided between the electrodes. In certain embodiments of the cell 110 herein, the separator 116 is disposed in ionic contact with the anode 112 to form an electrode assembly. In other embodiments, the separator 16 is disposed in physical and ionic contact with at least a portion of at least one major surface of the anode 112 to form an electrode assembly. In still further embodiments, the separator 116 is disposed in physical and ionic contact with substantially all of one major surfaces of the anode 112 to form an electrode assembly. In still further embodiments, the separator 116 is disposed in physical and ionic contact with substantially all of two major surfaces of the anode 112 to form an electrode assembly.

The physical and ionic contact between the separator and the anode may be accomplished by: direct application of the separator 116 on one or more major surfaces of the anode 112; enveloping the anode 112 with the separator 116; use of a frame or other structure for structural support of the anode 112, wherein the separator 116 is attached to the anode 112 within the frame or other structure; or the separator 116 may be attached to a frame or other structure, wherein the anode 112 is disposed within the frame or other structure.

Separator 116 may be any commercially available separator capable of electrically isolating the anode 112 and the cathode 114, while allowing sufficient ionic transport between the anode 112 and the cathode 114. Preferably, the separator 116 is flexible, to accommodate electrochemical expansion and contraction of the cell components, and chemically inert to the cell chemicals. Suitable separators are provided in forms including, but not limited to, woven, non-woven, porous (such as microporous or nanoporous), cellular, polymer sheets, and the like. Materials for the separator include, but are not limited to, polyolefin (e.g., Gelgard® commercially available from Dow Chemical Company), polyvinyl alcohol (PVA), cellulose (e.g., nitrocellulose, cellulose acetate, and the like), polyethylene, polyamide (e.g., nylon), fluorocarbon-type resins (e.g., the Nafion® family of resins which have sulfonic acid group functionality, commercially available from du Pont), cellophane, filter paper, and combinations comprising at least one of the foregoing materials. The separator 116 may also comprise additives and/or coatings such as acrylic compounds and the like to make them more wettable and permeable to the electrolyte.

In certain preferred embodiments, the separator 116 comprises a membrane having ion exchanging functional group incorporated therein, such as described in copending, commonly assigned: U.S. Pat. No. 6,183,914, entitled "Polymer-based Hydroxide Conducting Membranes", to Wayne Yao, Tsepin Tsai, Yuen-Ming Chang, and Muguo Chen, filed on Sep. 17, 1998, which is incorporated herein by reference in its entirety. In other embodiments, electrolyte is incorporated in a membrane, as described, for example, in Other embodiments of conductive membranes suitable as a separator are described in greater detail in: U.S. patent application Ser. No. 09/259,068, entitled "Solid Gel Membrane", by Muguo Chen, Tsepin Tsai, Wayne Yao, Yuen-Ming Chang, Lin-Feng Li, and Tom Karen, filed on Feb. 26, 1999; U.S. Pat. No. 6,358,651 entitled "Solid Gel Membrane Separator in Rechargeable Electrochemical Cells", by Muguo Chen, Tsepin Tsai and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Polymer Matrix Material", by Robert Callahan, Mark Stevens and Muguo Chen, filed on Aug. 30, 2001; all of which are incorporated by reference herein in their entireties. Preferably, with the incorporation of a separator 116 comprising a membrane having electrolyte incorporated therein, limitations related to dendrite penetration of the separator are minimized or eliminated.

EXAMPLE

Figure 3A:
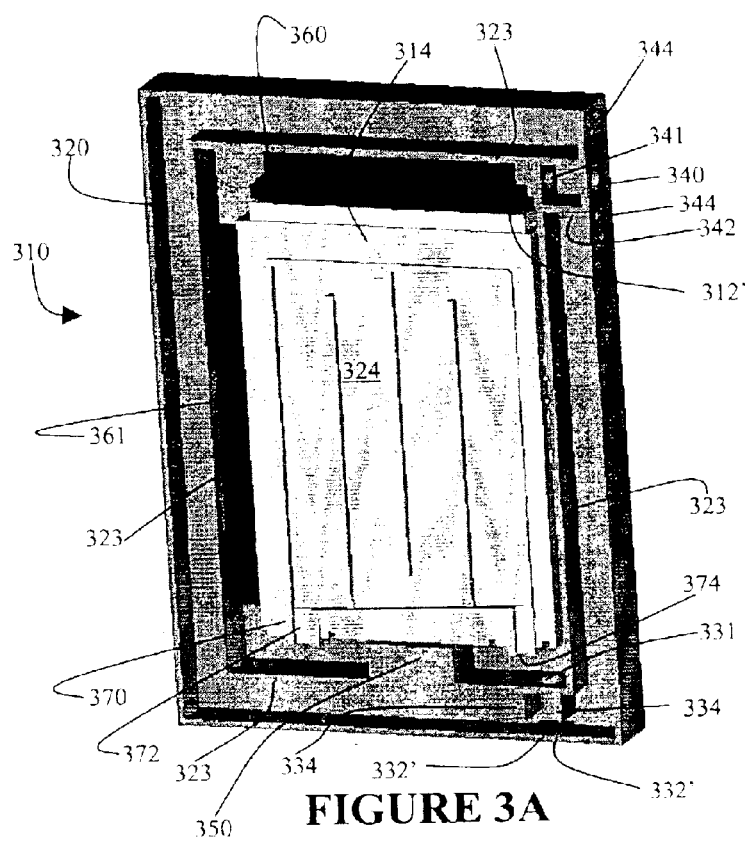
FIGS. 3A–3C depict a sectional isometric view and enlarged sectional views of an electrochemical cell incorporating airflow paths in accordance with the invention.
Figure 3B:
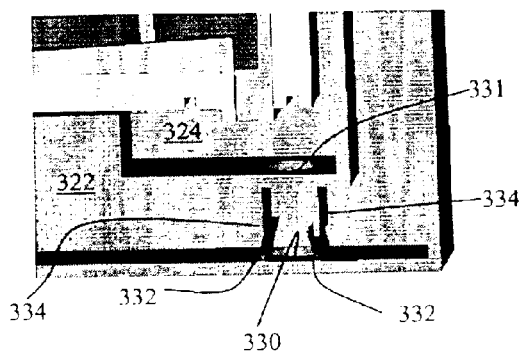
Figure 3C:
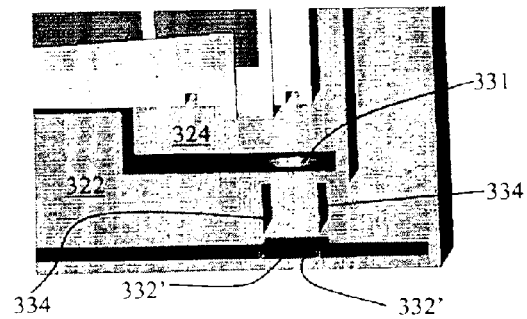

Referring now to FIGS. 3A–3C, a sectional isometric view and enlarged sectional views of a cell 310 is depicted. Cell 310 generally includes: an anode structure 312', which comprises a frame support portion and an active metal fuel portion; a cathode 314; and a frame 320. The frame 320 includes a periphery channel 322 defined by walls 323 and a baffle 342. The frame further includes stationary baffles 334 on opposing sides of an aperture 331 on the channel wall 323. The baffles 334 extend toward the outer wall of the frame 320. Additionally, opposing movable baffles or doors 332 are provided on the outer wall of the frame 320, which move to reveal an aperture 330. Therefore, as shown in FIG. 3B, when the doors 332 are open, a reaction path region 324 is in fluid communication with ambient or another air source outside of the cell 310. Further, when the doors 332 are open, fluid communication between reaction path region 324 and the periphery channel 322 is isolated. When the doors 332 are closed, as shown in FIG. 3C, reaction path region 324 is in fluid communication with the periphery channel 322.

Another set of apertures 340, 341 are provided in the frame 320 for fluid communication with ambient or a controlled air source. The aperture 341 is located on one end of a wall 323, and is isolated from the periphery channel 322 by the baffle 342 and a portion of a wall 323. Additionally, a pair of apertures 344 is provided which are in fluid communication with the periphery channel 322. These apertures are located proximate to the apertures 340 on the frame 320, wherein one aperture is provided on one side of the aperture 340 (generally at one end of the periphery channel 322), and the other aperture 344 is provided on the opposite side of the aperture 340 (which is the opposing end of the periphery channel 322).

The reaction path region 324 optionally includes a pair of heating elements 360, 361. The heating element 360 is attached to the top portion of the anode structure 312' and the heating element 361 is located on the wall 323, generally on the cathode side of the wall (i.e., as opposed to on the side of the periphery channel 322). Note that the heating elements may include passive heat sinks for storing thermal energy from surroundings, or active heating elements. Additionally, the reaction path region 324 includes directing channels 370, which are generally proximate to the cathode 314. These channels generally serve to allow airflow to be controlled across a substantial portion of the cathode 314. The channels 370 including first end 372 and a second and 374.

A one-way valve 350 is provided at an opening of the reaction path region 324 such that air that enters through apertures 330, 331 flows through the one-way valve 350 and into the main portion of the reaction path region 324 for electrochemical reaction with the cathode 314. Further, the one-way valve 350 servers to block air from crossing from the main portion of the reaction path region 324 to the second opening 374.

The metal air cell 310 may further include a controller operably attached thereto. For example, the controller may be operably attached to be one or more fans or blowers associated with openings 330 and 340 bond the outside of the frame 320. Further, the controller may be operably attached to the doors 332 to control opening and closing thereof. Also, a controller may control operation of the optional heating elements 360, 361. Therefore, the cell 310 may switch between open loop mode and semi-closed loop mode, and vice versa, to maintain a desired temperature and/or reaction rate within the cell 310. Accordingly, the controller may be associated with one or more temperature sensors, oxygen sensors, voltage sensors, current sensors, or combination comprising at least one of the foregoing associated devices.

An alternative embodiment, a single fan or blower may be provided at one of the apertures 330, 340. The fan may be reversed to either push air into the associated aperture, or to pull air from the cell. For example, the fan may be associated with the aperture 330, such that there may be forced into the aperture 330, or forced out through the aperture 330. Where air is pulled through the aperture 330, the vacuum forces will suck air in through the aperture 340. Alternatively, the fan may be associated with the aperture 340, such that air may be forced into the aperture 340, or sucked in through the aperture 330.

Figure 4:
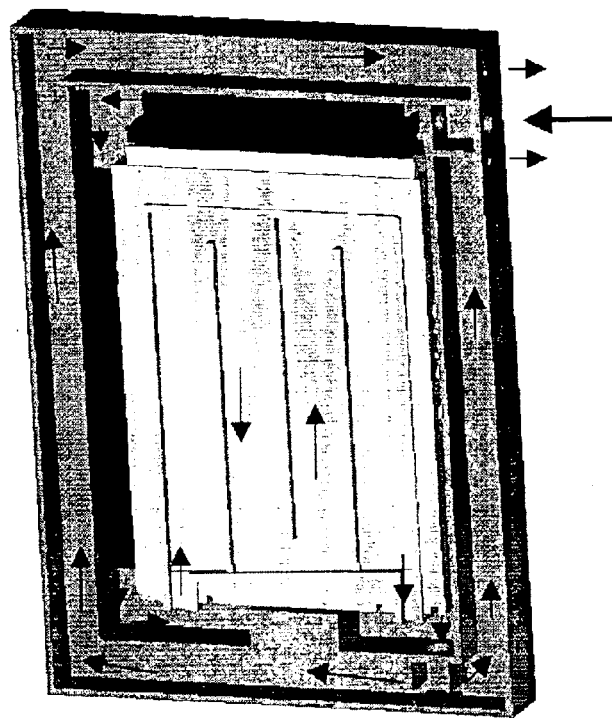
FIG. 4 depicts a semi-closed mode of operation of an electrochemical cell incorporating airflow paths in accordance with the invention.

Referring now to FIG. 4 in conjunction with FIGS. 3A–3C, the semi-closed mode of cell 310 is depicted. In this mode, and the doors 332 are closed, generally by the air pressure within the cell. Air is introduced the apertures 340, 341 and into the reaction path 324. Within the reaction path region 324, the air flows through the heating element 360 attached to the anode structure 312', and into the heating element 361, attached to the inside portion of the wall 323. Thus, the heated air is introduced into the first end 372 of the reaction channel 370, and into the reaction channel 370. Therein, the air traverses across a substantial portion of the cathode 314, generally going up, down, up, down, and out of the second opening 374 of the reaction channel 370. Therefore, a substantial portion of the cathode 314 is exposed to the heated air for electrochemical reaction with the oxygen therein. Air exits the reaction path region 324 through the aperture 331, and is introduced into the channel 322, generally going both in the left and right directions as shown in the figures. Accordingly, the air traverses around the periphery channel 332. The air ultimately exits the channel 322 through apertures 344. The air that circulates in the periphery 322 serves to maintain some heat within the cell 310. This is particularly useful in cold ambient air environments.

Figure 5:
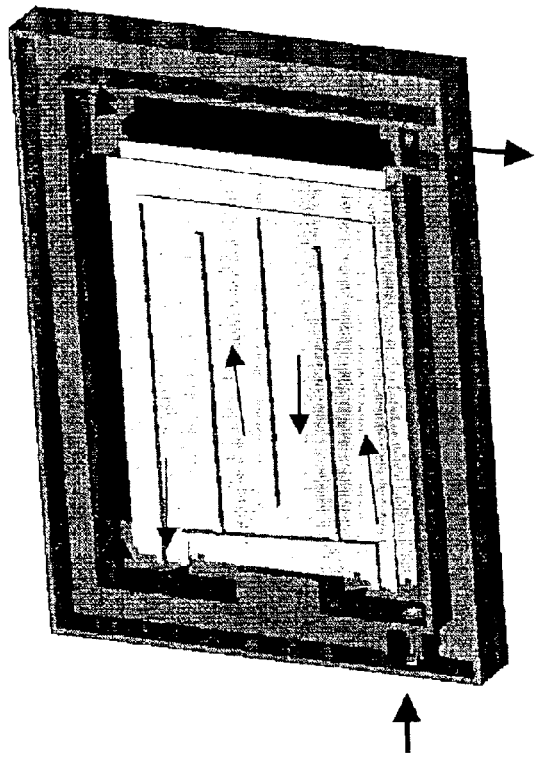
FIG. 5 depicts an open loop mode of operation of an electrochemical cell incorporating airflow paths in accordance with the invention.

Referring now to FIG. 5, the open loop mode is depicted. The doors 332 are opened, such that air flows into the apertures 330,331 (bypassing the periphery channel 322) and into the reaction path region 324. The doors 332 may be opened by the force of the airflow into the reaction path region 324, vacuum forces from the aperture 340, separate mechanical devices, or a combination thereof. A portion of the air is directed to the cathode 314 via the second opening 374, and a portion of the air flows through the one way valve 350. A portion of the air that flows through the one way valve 350 may flow into the cathode 314 (i.e., via the first end 372), but a substantial portion of the air through the one way valve 350 preferably flows around the cathode 314 (e.g., in the regions of the optional heating elements 361, 360, which may be switched off depending on the particular needs) and exiting the cell via the apertures 341, 340. In this manner, at higher temperature environments, unreacted air, which is at a lower temperature than the reacted air, may flow around the components of the cell 310 for additional cooling.

Figure 6:
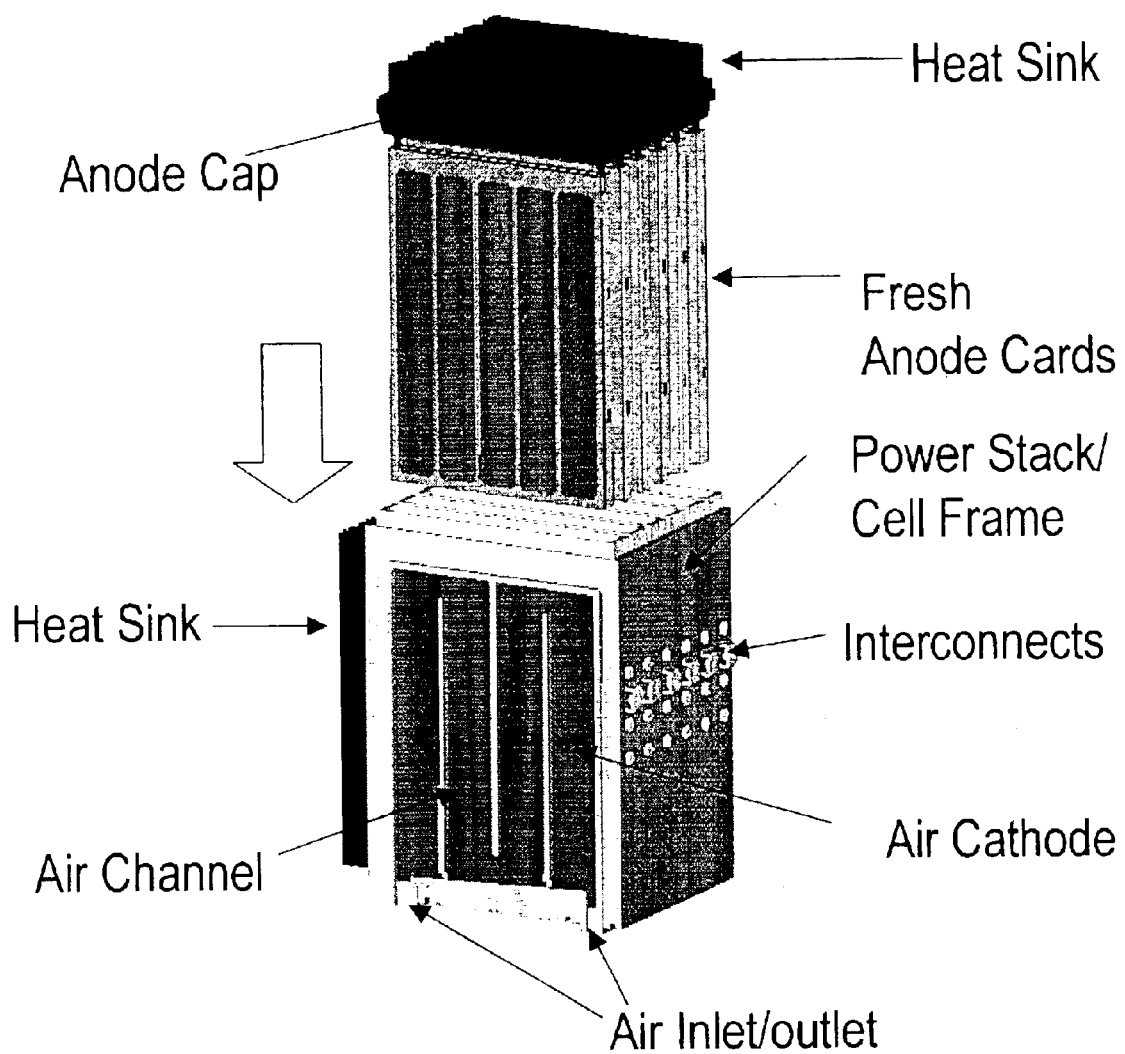
FIG. 6 depicts a plurality of electrochemical cells of the present invention in an unassembled state.

Referring to FIG. 6, a plurality of cells such as cells 310 are depicted, in an unassembled state. These cells may be wired in various configurations to provide the desired output voltage. Additionally, a plurality of these cells stacks may be connected to each other, for additional versatility.

Figure 7:
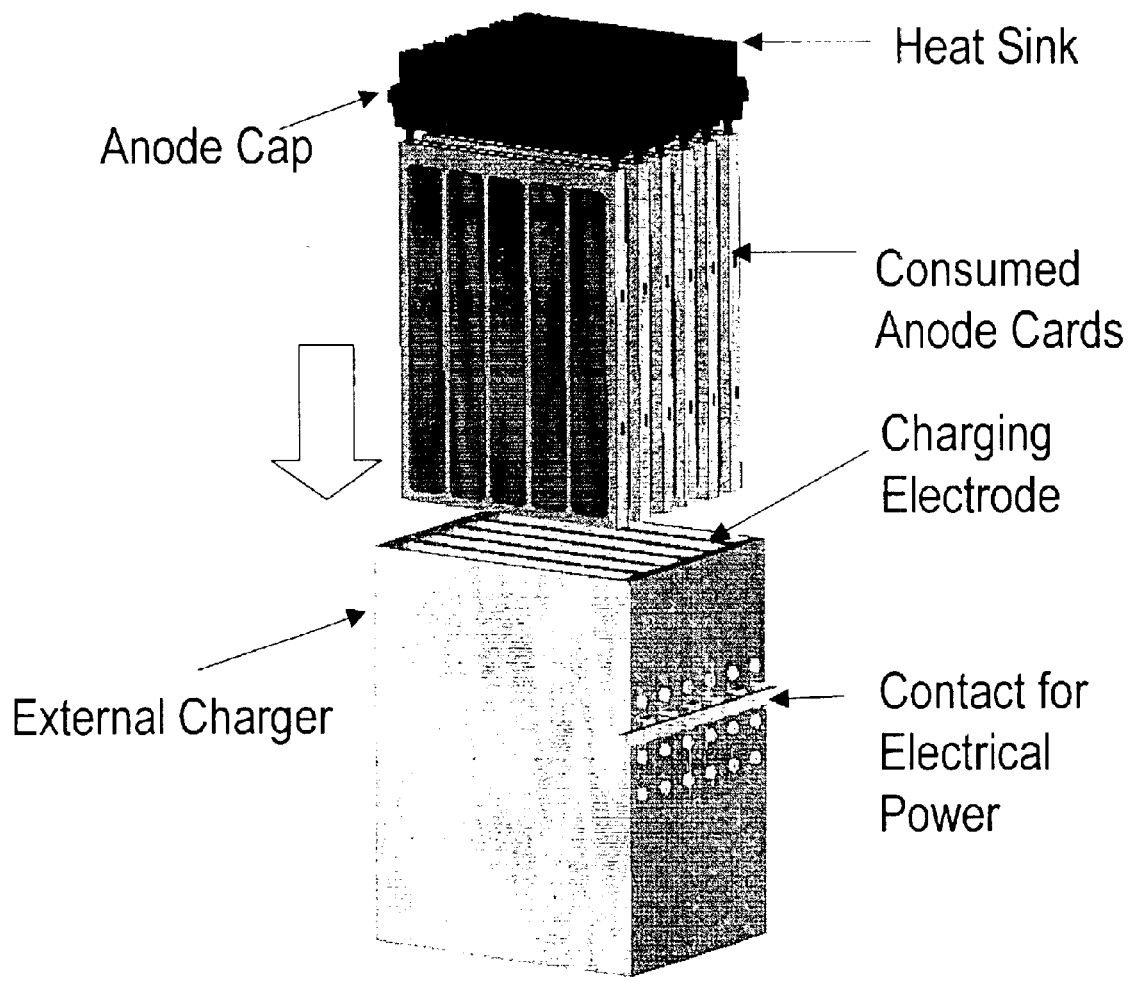
FIG. 7 depicts an electrochemical cell system including an external charger.
Figure 8:
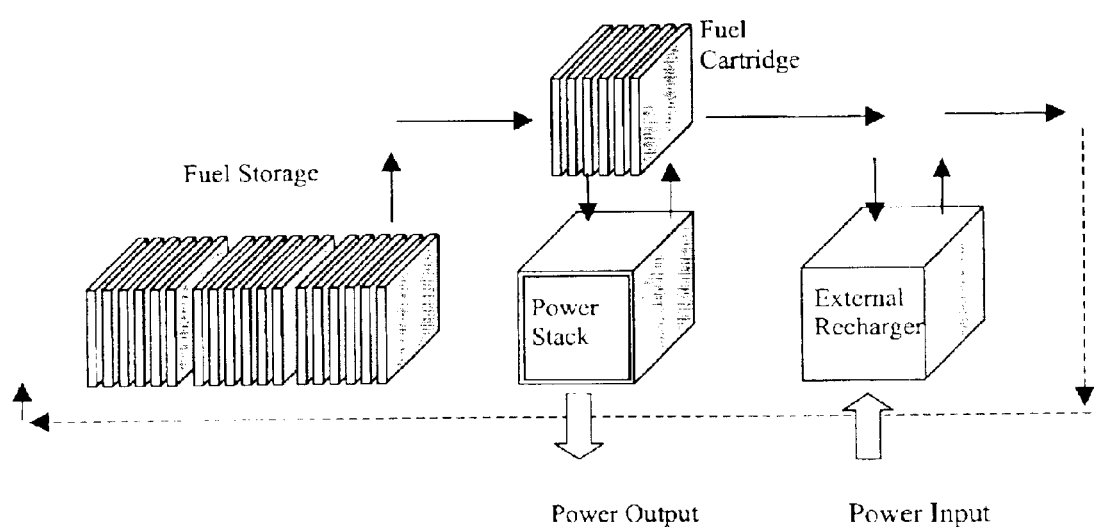
FIG. 8 depicts a system and method steps for storing, inserting, and recharging metal air fuel.

Referring to FIG. 7, an external charger may optionally be provided, wherein consumed anodes may be recharged. A method of storing, inserting, and recharging metal air fuel is generally depicted in FIG. 8, wherein storage fuel cards are inserted into a power stack, electrochemically reacted to produce power output, and subsequently recharged and external recharger, which receives a power input. The recharged fuel cartridges are then storage or reused to produce power.

It is understood that the components of the metal air cell 310, such as the frame 220 and other accompanying parts, may be formed of any suitable material that is can impart the necessary structural integrity, and can withstand the electrochemical environment, including the electrolyte and the thermal limits. Suitable materials include, but are not limited to, acrylonitrile butadiene styrene polymer, polyvinyl chloride, epoxy glass, fluorocarbons, polycarbonate, the like, and combinations comprising at least one of the foregoing materials. Further, for low temperature operations (e.g., below −20° C.), thermal insulation materials are preferred. For very low temperatures (e.g., below −20° C.), advanced insulating technology (e.g., layered mylar), such as that used in cryogenic systems, are preferred.

The airflow systems described herein are beneficial for systems that operate at low temperatures. These systems, for example in the semi-closed loop mode, may use internal heat and/or optional heating elements to maintain desired temperature levels within the cell, even when the ambient temperature is very low (e.g., less than 0° C., −20° C., or even −40° C.). Further, when used in combination with the open loop mode, precise temperature control may be established. The auxiliary supports (e.g., the heaters, blowers, controls, sensors, etc.) may be powered by the cell itself, or optionally coupled to a separate battery or other power source.

Additionally, for high ambient temperature (e.g., greater than about 30° C., 40° C., or even 50° C.), the open loop mode is very effective. The continuous airflow through the cell removes a substantial amount of the heat generated by the internal resistance.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A metal air cell comprising:
    a cathode having an oxidant side and an anode side;
    an anode having a side complementary to the anode side of the cathode;
    a separator between the anode and cathode to electrically isolate the anode and the cathode, and
    a frame for supporting the cathode and the anode, the frame configured with a periphery air flow path channel for storing heat generated by air that has reacted with the cathode oxidant side, and a reaction path region complementary to the cathode oxidant side.

2. The metal air cell as in claim 1, further comprising one or more controllable baffles for alternating between an open mode of operation wherein heat storage in the periphery air flow path channel is minimized and a semi-closed mode of operation wherein heat is stored in the periphery air flow path channel.

3. The metal air cell as in claim 1 wherein a liquid electrolyte is provided in ionic communication with the anode and the cathode.

4. The metal air cell as in claim 1 wherein a gelatinous electrolyte is provided in ionic communication with the anode and the cathode.

5. The metal air cell as in claim 1 wherein the separator comprises an electrolyte containing membrane in ionic communication with the anode and the cathode.

6. The metal air cell as in claim 1, further comprising a fan or a blower for introducing oxidant into the periphery channel and/or the reaction path region with a.

7. The metal air cell as in claim 6, further comprising a scrubber to remove carbon dioxide for ambient air.

8. The metal air cell as in claim 1, wherein oxidant is introduced into the reaction path region through a first outer aperture in fluid communication with an outer portion of the frame, and a first inner aperture in fluid communication with the reaction path region, wherein oxidant flow into the periphery channel is minimized.

9. The metal air cell as in claim 8, further comprising a pair of movable baffles to minimize oxidant flow into the periphery channel.

10. The metal air cell as in claim 8, wherein oxidant exits the reaction path region through a second inner aperture in fluid communication with the reaction path region and a second outer aperture in fluid communication with the outer portion of the frame, wherein oxidant flow into the periphery channel is minimized.

11. The metal air cell as in claim 10, further comprising a pair of baffles to minimize oxidant flow into the periphery channel.

12. The metal air cell as in claim 1, wherein oxidant is introduced into the reaction path region through a first outer aperture in fluid communication with an outer portion of the frame, and a first inner aperture in fluid communication with the reaction path region, further wherein oxidant is prevented from exiting the cell but maintained in the periphery channel.

13. The metal air cell as in claim 12, wherein oxidant exits the reaction path region through a second inner aperture in fluid communication with the reaction path region and enters the periphery channel.

14. The metal air cell as in claim 13, wherein oxidant exiting the reaction path region is prevented from exiting the cell by a movable baffle in a closed state.

15. The metal air cell as in claim 14, wherein the movable baffle is switchable to an open state wherein oxidant may exit the system through a second outer aperture in fluid communication with the outer portion of the frame revealed by the movable baffle in the open state.

16. The metal air cell as in claim 1, further comprising a passive heat sink within the frame.

17. The metal air cell as in claim 1, further comprising an active heat element within the frame.

18. The metal air cell as in claim 1, further comprising a controller for controlling a quantity of oxidant flow into the reaction path region.

19. The metal air cell as in claim 1, wherein the anode comprises a metal material selected from the group consisting of zinc, calcium, lithium, magnesium, ferrous metals, aluminum, and oxides of at least one of the foregoing metals, or combinations and alloys comprising at least one of the foregoing metal materials.

20. The metal air cell as in claim 1, wherein the cathode comprises an air diffusion cathode.

21. The metal air cell as in claim 1 wherein the anode is removable.

22. A metal air cell system comprising a plurality of metal air cells as in claim 1.

23. A metal air cell system comprising a plurality of metal air cells as in claim 1, wherein the anodes of the cells are removable.

24. The metal air cell system as in claim 22, wherein a charging system is provided to recharge consumed anodes.

25. A method of operating an electrochemical cell, the electrochemical cell including an anode and a cathode in ionic commutation and electrically separated with a separator, comprising:

directing unreacted oxidant substantially directly to the cathode and directing reacted oxidant out of the cell in a first mode of operation; and directing unreacted oxidant substantially directly to the cathode and directing reacted oxidant into a periphery region to retain heat in a second mode of operation.

* * * * *